July 23, 1963 J. RUDELICK 3,098,578
PRESSURE VESSEL
Filed Jan. 15, 1960
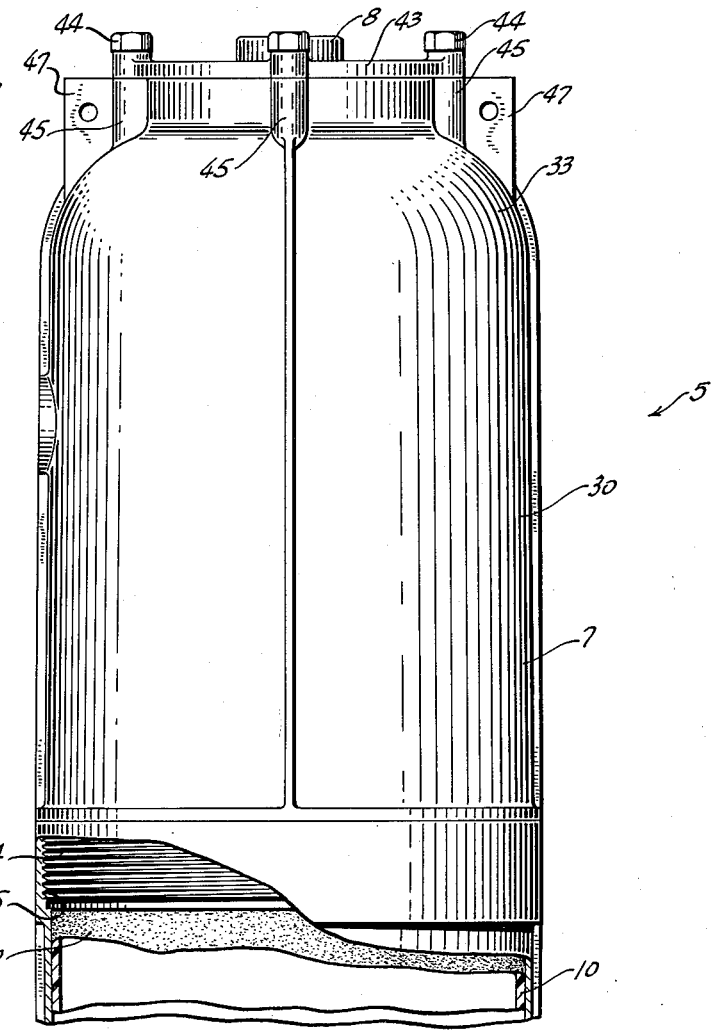
Fig. 1.
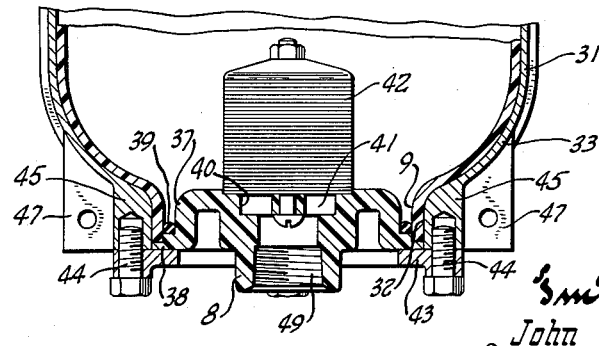
Inventor
John Rudelick
By [signature]
Attorney

United States Patent Office 3,098,578
Patented July 23, 1963

3,098,578
PRESSURE VESSEL
John Rudelick, Milwaukee, Wis., assignor to Bruner Corporation, Milwaukee, Wis., a corporation of Wisconsin
Filed Jan. 15, 1960, Ser. No. 2,644
5 Claims. (Cl. 220—5)

This invention relates generally to hollow articles made of thermoplastic material, such as tanks and pressure vessels; and in a more specific sense the invention relates to a pressure vessel having an inert and non-corroding surface at its interior.

Heretofore tanks adapted to hold water under pressure, such as the tanks of water heaters, water softeners and the like, have generally been fabricated of plate or sheet metal, and have frequently been provided with some kind of plastic, glass or porcelain liner which was intended to form an inert and non-corroding interior surface for the tank and to render it leakproof. The success of a liner that was bonded to or coated upon the inner surface of a metal tank wall was dependent primarily upon how clean the interior surface of the tank could be made before the liner material was applied to it. However, it was almost impossible to effect perfect cleansing of the metal surface because there were always fissures or crannies present around spuds (inlet and outlet fittings) or around the welded joints between the end bells of the tank and its cylindrical side walls. Moreover, glass and porcelain linings would not permanently adhere to weld beads, or even to spot welds, and in such areas the liner material tended to fall away from the inner surface of the tank and permit corrosion to start.

In an effort to provide a satisfactorily inert and non-corroding interior surface for the fabricated metal tanks used in water softening and water conditioning apparatus, tanks made entirely of plastic or plastic impregnated fibreglass have been tried, but in most cases have proved unsatisfactory. One usual manner of forming such tanks and liners was by the "lay-up" method, wherein a layer of plastic material was sprayed onto a form, a layer of fibreglass rovings was applied to the plastic, and another layer of plastic was sprayed over the rovings, the alternate layers of plastic and fibreglass being built up in this manner until the desired thickness of material had been attained. Tanks made by the "lay-up" method, besides being expensive to manufacture, were costly to handle and ship because they could not stand severe impacts or high localized pressures. Their most important disadvantage, however, was that they were subject to "weeping." i.e., slight leakage through minute holes and fissures.

Another commonly used method of manufacturing tanks and pressure vessels was to form them in several parts, each produced by vacuum forming of sheet material, by the "lay-up" method, or in some other manner, with the several parts joined by bonded seams. Such tanks had the disadvantage that they were often unattractive or even unsightly in appearance, and frequently had the more serious defect of leaking at the seams.

It has also been proposed to incorporate a flexible plastic bag in a fabricated metal tank such as used in water softeners, but such a bag-like liner was never successful. It was not only very troublesome to install and service, but the material from which the bag had to be made would not stand up in use.

By contrast it is an object of this invention to provide a pressure vessel having an inert and non-corroding surface at its interior comprising a one piece inner tank member of thermoplastic material that is non-porous and hence leakproof, and an outer member which may comprise an inexpensive and easily manufactured rigid shell surrounding and closely embracing the inner tank member to support the same and reinforce it against high pressures.

More specifically, it is an object of this invention to provide an inert and non-corroding seamless thermoplastic liner for a tank or pressure vessel, formed from a single length of thermoplastic tubing having its medial portion radially expanded, which liner is substantially tough and stiff enough to be normally form retaining and thus usable as a tank capable of withstanding limited internal pressure, but which liner is adapted for cooperation with an outer reinforcing member therefor in a way that renders the liner capable of safely withstanding such high internal pressures as would otherwise result in its rupture.

It is also an object of this invention to provide a tank having an inner fluid retaining member formed from a length of thermoplastic tubing, the manufacture of which requires no highly skilled labor or special materials and can be carried out with relatively simple and inexpensive equipment.

In this connection it is also a specific object of this invention to provide an inert and non-corroding self-supporting liner for tanks and pressure vessels which can be readily tested for leaks before being inserted into the rigid supporting structure of the vessel of which it is intended to form a part, and which thus brings about substantially lower production costs than previous liners which had to be applied to the tank wall and which could not be tested until the tank was substantially completely manufactured.

More specifically it is an object of this invention to provide a tank or pressure vessel having an inner fluid retaining member which is sufficiently rigid to be form retaining, and is formed of thermoplastic material, and having an outer reinforcing member in which the fluid retaining member is enclosed and which provides the necessary tensile strength to resist internal fluid forces that the inner member could not otherwise withstand, wherein the inner and outer members need not fit one another with any greater degree of closeness than is attainable with ordinary, inexpensive production methods, and wherein the outer member need not be made fluid tight.

With the above and other objects in view which will appear as the description proceeds, this invention resides in the novel method and apparatus hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

The single FIGURE is a view, partly in side elevation and partly in longitudinal section, of a tank or pressure vessel embodying the principles of this invention.

Referring now more particularly to the accompanying drawing, the numeral 5 designates generally a tank or pressure vessel embodying the principles of this invention and which comprises, in general, an inert and non-corroding inner member or liner 6 of thermoplastic material, an outer member or shell 7 surrounding and closely embracing the liner, and a pair of end plugs 8 which close the ends of the liner.

The thermoplastic tank liner contemplated by this invention may have any of a wide variety of shapes and sizes, depending upon the application in which it is to be employed, but in the form illustrated, it is characterized by tubular end portions 9 and by a cylindrical medial portion 10 which is coaxial with and has a substantially larger girth than the end portions and the interior of which is in open communication with the end portions. Since the liner has a degree of stiffness such as to render it self supporting and normally form retaining, it is in effect a tank or vessel in itself, and under certain circumstances, as brought out hereinafter, could be used without the shell 7.

As explained in my copending application Serial No. 94,847, entitled "Method and Means for Forming Pressure Vessels," filed March 10, 1961, as a division of this application, the thermoplastic liner 6 is formed from a length of thermoplastic tubing, which may be cut from standard straight stock having a uniform diameter and wall thickness along its length.

The medial portion of the tubing is heated to a temperature at which its walls are plastically deformable, and while the tubing material is in such plastic condition, its medial portion is expanded by producing a pressure difference across its wall. The form to which the medial portion of the tube is expanded is controlled by confining it within a hollow mold having a cavity shaped in correspondence with the desired shape of the finished inner tank member.

Certain of the high density thermoplastics which are suitable for vacuum forming when in the form of sheet stock are suitable for the inner members of tanks of this invention. Materials which have been found suitable for the purpose include polystyrene, vinyl, and polyethylene. The wall thickness of the tubing is not critical, so long as it is sufficient to bear expansion to the desired diameter of the medial portion without rupturing. For example, a 4½" O.D. "Kralastic" tube having a 3/16" wall thickness has been very successfully expanded to a 7¼" diameter medial portion. (Kralastic is a trade name for a nonporous thermoplastic comprised of styrene that has been modified by an elastic material such as rubber, and which thus also possesses elastic properties.)

A thermoplastic vessel made in accordance with the method outlined will in many cases be sufficiently rigid and sturdy in itself to serve as a tank, particularly where it is required to sustain only small pressures or to contain relatively small volumes of liquid but for a larger vessel it is preferably provided with the rigid outer shell 7 which lends it substantial rigidity and reinforces it against rupturing due to elongated as well as outward bulging under high pressures, as well as providing means for retaining the end plugs 8 in place. However, even if an outer reinforcing shell is to be used, the thermoplastic inner vessel can be tested for small leaks before the shell is installed, so that any defects which are not apparent from visual inspection can be found before further expense has been incurred in completely assembling the tank.

The outer shell 7 comprises a pair of cooperating substantially tubular members 30 and 31, adapted to be connected with one another at their inner ends and to substantially closely fit over and enclose all of the liner except its tubular end portions 9, which project through coaxial apertures 32 at the outer ends of the shell members. Each of the shell members has a converging spherically rounded shoulder 33 adjacent to its outer end that closely conforms in contour to and engages the underlying portion of the liner and which is thus well adapted to withstand high pressures by reason of its dome-like configuration. It will be evident that the shell members can be fastened together in any suitable manner that assures engagement of the rounded shoulders 33 with the convergent ends of the liner. Since the primary function of the shell is to lend reinforcement to the liner, which constitutes the fluid retaining component of the vessel, no precautions need be taken to keep the shell leakproof.

Thus the connection between the shell members 30 and 31 shown in the drawing comprises an external thread 34 on a reduced diameter portion at the inner end of one member 30 and a counterbore 35 opening to the inner end of the other member and which is provided with a cooperating internal thread. The screw threads thus enable the rounded shoulders or ends 33 of the shell members to be drawn toward one another whatever extent is necessary to dispose them in engagement, or force transmitting relation, to the convergent ends of the fluid container or liner.

The plugs 8 which seal the ends of the liner 6 may be formed of plastic. Each has a cylindrical body portion 37 of substantial axial length, adapted to project into a tubular end portion 9 of the liner, and a radially projecting flange 38 adapted to overlie an end of the liner. An O-ring 39 confined radially between the body portion 37 of the plug and the inner surface of the liner end portion 9 provides a leak proof seal between the plug and the liner. The plug may be imperforate, or it may have a threaded aperture 40 to provide for connection of an inlet or outlet fitting. Since the end plugs are molded of plastic, it is also a simple matter to provide each of them, if desired, with a rib 41 extending substantially diametrically across the aperture 40 and which provides a spider-like support for a disc distributor 42 which may be of known construction.

Each end plug is secured in place by means of an end ring 43 which overlies the flange 38 on the plug and clampingly confines said flange against the rim of the tubular end portion 9 of the liner. Screws 44, extending parallel to the tank axis through aligned holes in the end ring and threaded into bosses 45 on the end portion of the adjacent shell member, fasten the end ring in place and thus secure the end plug with which it cooperates.

The shell members 30 and 31 may also be provided with mounting lugs 47 by which the tank can be mounted in any desired manner.

From the foregoing description taken together with the accompanying drawing it will be apparent that this invention provides a novel pressure tank having a rigid outer shell which can be made in two or more readily assembled parts and a seamless inner vessel of thermoplastic material which may be readily vacuum formed from a single length of thermoplastic tubing and which is inert, non-corroding and leakproof.

What is claimed as my invention is:
1. In a tank:
A. means defining a hollow outer shell having high tensile strength and having its interior shaped to provide an elongated cylindrical body and convergent shoulders connecting with coaxial smaller diameter tubular neck portions on the ends of the body;
B. a hollow inner one piece fluid retaining member inside the shell, which is substantially stiff and normally form retaining, and which has a cylindrical body wall contiguous to the shell body and tubular neck portions at its ends projecting coaxially into those on the shell and contiguous thereto, said inner member having convergent shoulders engaging those on the shell so that the latter secures the inner member against endwise movement relative to the shell, and said inner member being made of a homogeneous, nonporous plastic material having elastic characteristics on the order of those of "Kralastic," and its wall being sufficiently elastic to enable those portions thereof which do not fit the cylindrical body of the shell closely enough to engage the same in the absence of internal pressure to be distended into engagement with the shell body in response to internal pressure, to thus transmit to the outer shell the force which fluid imposes on the inner member so that the latter can safely with- stand pressures far exceeding those that would rupture it if it were unreinforced;
C. end closure means at the ends of the tank, each having a portion projecting into the adjacent tubular neck portion on the inner member and cooperating with a surrounding portion of the outer shell to define a cylindrical well into which the adjacent tubular portion on the inner member projects, the end closure means at one end of the tank having a hole therethrough communicating with the interior of the tank to provide for connection of the same with a source of fluid under pressure;
D. means connecting the end closure means with the outer member so that the latter holds the end closure means engaged with the tubular neck portions at the ends of the inner member and receives the force which fluid under pressure in the tank imposes upon the end closure means;
E. and means sealing the end closure means in said tubular end portions on the inner member, comprising an annular pressure seal gasket in each of said wells, concentrically interposed between the inner surfaces of said tubular end portions on the inner member and those portions of the end closure means that project thereinto.

2. In a tank:
A. means defining a hollow outer shell having high tensile strength and having its interior shaped to provide an elongated cylindrical body and convergent shoulders at the ends of the body, at least one of said shoulders having a smaller diameter tubular neck portion coaxially connected therewith;
B. a hollow inner one piece fluid retaining member inside the shell, which is substantially stiff and normally form retaining, and which has a cylindrical body wall contiguous to the shell body and a tubular neck portion at one end projecting coaxially into the tubular neck portion on the shell and contiguous thereto, said inner member having convergent shoulders engaging those on the shell so that the latter secures the inner member against endwise movement relative to the shell, and said inner member being made of a homogeneous, nonporous plastic material having elastic characteristics on the order of those of "Kralastic," and its wall being sufficiently elastic to enable those portions thereof which do not fit the cylindrical body of the shell closely enough to engage the same in the absence of internal pressure to be distended into engagement with the shell body in response to internal pressure, to thus transmit to the outer shell the force which fluid imposes on the inner member so that the latter can safely withstand pressures far exceeding those that would rupture it if it were unreinforced;
C. end closure means for said tubular neck portion on the inner member having a portion projecting thereinto and cooperating with a surrounding portion of the outer shell to define a cylindrical well into which the neck portion on the inner member projects, said end closure means having a hole therein communicating with the interior of the tank through said tubular neck portion on the inner member, to provide for connection of the tank with a source of fluid under pressure;
D. means connecting said end closure means with the outer member so that the latter holds the end closure means engaged with the tubular neck portion on the inner member and receives the force which fluid under pressure in the tank imposes upon the end closure means;
E. and means sealing the end closure means in said tubular neck portion on the inner member, comprising an annular pressure seal gasket in said well, concentrically confined between the inner surfaces of said tubular end portion on the inner member and those portions of the end closure means that project thereinto.

3. A pressure vessel suitable for use in water supply systems, having the following characterizing features:
A. an inner member to contain fluid and which
 (1) is form retaining,
 (2) has an elongated hollow body portion, and
 (3) has convergent portions at its ends extending a distance beyond the ends of the body portion, at least one of said convergent end portions terminating in a tubular neck which provides a coaxial mouth for the vessel;
B. a rigid, hollow, outer reinforcing structure within which the inner member is confined, having its interior shaped to substantially fit the inner member and having connected end portions overlying the convergent end portions of the inner member and further having a portion surrounding and contacting said tubular neck to support the same, said reinforcing structure preventing outward flexure of said convergent end portions of the inner member in consequence of the internal forces which fluid under pressure imposes thereon; and
C. the inner member being formed of plastic material which is
 (1) homogeneous and nonporous,
 (2) sufficiently stiff to be normally self supporting, and
 (3) sufficiently elastic to enable those portions of its wall which do not engage the outer reinforcing structure in the absence of internal pressure to be distended into such engagement in response to pressure in its interior and thereby transmit to the outer reinforcing structure the forces which fluid imposes on the inner member, so that the latter can safely withstand pressures far exceeding those that would rupture it if it were not reinforced.

4. A pressure vessel adapted to hold fluid under varying pressures, such as those encountered in water supply systems, characterized by:
A. a one piece, seamless fluid container that is normally form retaining and consists solely of a homogeneous, nonporous thermoplastic material having elastic characteristics on the order of "Kralastic," said fluid container having
 (1) a hollow body portion,
 (2) convergent end walls joined to the body portion by outwardly convex wall portions of large radius to minimize the likelihood of severe localized bending stresses at the junctions between the body portion and said convergent end walls as a result of flexure thereat, each of said end walls tapering to
 (3) an outwardly extending tubular neck smaller in diameter than the body portion and coaxial therewith;
B. an inelastic reinforcing structure that need not be fluid tight, disposed around the exterior of the fluid container, and to which is transmitted fluid pressure forces above a value that the fluid container can safely withstand, said outer reinforcing structure comprising
 (1) means providing an inelastic body portion encircling the body portion of the fluid container and having inner surfaces in such proximity to the exterior of the body portion of the fluid container that pressure produced distension of its body portion will bring it into force transmitting engagement with said body portion of the reinforcing structure without stressing the body portion of the fluid container beyond its elastic limit, thereby compensating for unpredictable manufacturing variations in the girth dimensions of the body portions of both the fluid container and the outer reinforcing structure, (2) a pair of rigid end wall portions, one overlying each of said convergent end walls of the fluid container, each having its interior shaped to substantially conform to the exterior shape of its end wall on the fluid container, (3) a rigid collar embracing each of said tubular necks on the fluid container and fixed to the adjacent rigid end wall portion of the reinforcing structure, (4) and means connecting said rigid end wall portions with one another to hold them against spreading apart from positions at which they snugly confine the fluid container between them and are in force transmitting relation to the convergent end walls of the fluid container so that the reinforcing structure bears the forces that the fluid container could not safely withstand.

5. The pressure vessel of claim 3, wherein said outer reinforcing structure includes holding means operatively connected with said end portions thereof and by which said end portions are fixed in any spatial relationship required to establish them in force transfer relationship with the underlying convergent end portions of the inner member, regardless of unpredictable manufacturing variations, either inward or outward, in the spacing of said convergent end portions of the inner member.

References Cited in the file of this patent

UNITED STATES PATENTS

| | | |
|---|---|---|
| 1,092,999 | Kinnear | Apr. 14, 1914 |
| 2,053,314 | Balyozian | Sept. 8, 1936 |
| 2,146,381 | Rheem | Feb. 7, 1939 |
| 2,221,470 | Brown | Nov. 12, 1940 |
| 2,348,738 | Hofmann | May 16, 1944 |
| 2,503,339 | Jandus | Apr. 11, 1950 |
| 2,718,583 | Noland | Sept. 20, 1955 |
| 2,721,674 | Lazard | Oct. 25, 1955 |
| 2,736,925 | Heisler | Mar. 6, 1956 |
| 2,744,655 | Vunk | May 8, 1956 |
| 2,783,503 | Sherman | Mar. 5, 1957 |
| 2,861,530 | Macha | Nov. 25, 1958 |
| 3,010,602 | Randolph | Nov. 28, 1961 |

FOREIGN PATENTS

| | | |
|---|---|---|
| 222,719 | Australia | June 16, 1959 |